(12) United States Patent
DeGraaf

(10) Patent No.: US 6,778,077 B1
(45) Date of Patent: Aug. 17, 2004

(54) VEHICLE MOUNTED WARNING ASSEMBLY

(76) Inventor: Henry C. DeGraaf, 3850-13$^{th}$ Ave. North, #201, St. Petersburg, FL (US) 33713

( * ) Notice: Subject to any disclaimer, the term of this patent is extended or adjusted under 35 U.S.C. 154(b) by 5 days.

(21) Appl. No.: 10/334,184

(22) Filed: Jan. 2, 2003

(51) Int. Cl.$^7$ .................................................. B60Q 1/26
(52) U.S. Cl. ...................... 340/468; 340/470; 340/433; 340/426.33; 340/426.15; 340/431; 340/461; 340/471; 362/541; 362/540; 362/485
(58) Field of Search ................................ 340/468, 470, 340/433, 426.33, 426.15, 431, 461, 471; 362/541, 540, 485

(56) References Cited

U.S. PATENT DOCUMENTS

| | | | |
|---|---|---|---|
| 3,895,348 A | 7/1975 | Palermo | |
| 4,622,494 A | 11/1986 | Johnson | |
| 4,695,929 A * | 9/1987 | Smith | 362/140 |
| 4,825,191 A | 4/1989 | Ching-Hwei | |
| 4,884,172 A | 11/1989 | Walker | |
| D323,303 S | 1/1992 | Johansson et al. | |
| 5,249,381 A * | 10/1993 | Panossian | 40/591 |
| 5,384,882 A * | 1/1995 | Shimamune et al. | 385/116 |
| 5,604,480 A * | 2/1997 | Lamparter | 362/478 |
| 5,845,990 A * | 12/1998 | Hymer | 362/541 |
| 6,275,149 B1 | 8/2001 | Tung | |
| 6,401,374 B1 * | 6/2002 | Bahmad | 40/593 |

* cited by examiner

Primary Examiner—Daniel J. Wu
Assistant Examiner—Tai T. Nguyen

(57) ABSTRACT

A vehicle mounted warning assembly for providing highly visible safety measures for trucks and trailers upon roadways. The vehicle mounted warning assembly includes a display assembly being adapted to mount to a vehicle for providing a warning to other motorists, and including one or more plates, and also including an assembly of illuminating light being attached to the one or more plates; and also includes a support assembly being adapted to mount to a vehicle and supporting the display assembly.

4 Claims, 6 Drawing Sheets

VEHICLE MOUNTED WARNING ASSEMBLY

BACKGROUND OF THE INVENTION

1. Field of the Invention

The present invention relates to warning displays for vehicles and more particularly pertains to a new vehicle mounted warning assembly for providing highly visible safety measures for trucks and trailers upon roadways.

2. Description of the Prior Art

The use of warning displays for vehicles is known in the prior art. More specifically, warning displays for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,275,149; 4,825,191; 3,895,348; 4,884,172; 4,622,494; and Des. 323,303.

While these devices fulfill their respective, particular objectives and requirements, the aforementioned patents do not disclose a new vehicle mounted warning assembly. The prior art includes triangular-shaped reflectors being attached to trailers and trucks.

SUMMARY OF THE INVENTION

The general purpose of the present invention, which will be described subsequently in greater detail, is to provide a new vehicle mounted warning assembly which has many of the advantages of the warning displays for vehicles mentioned heretofore and many novel features that result in a new vehicle mounted warning assembly which is not anticipated, rendered obvious, suggested, or even implied by any of the prior art warning displays for vehicles, either alone or in any combination thereof. The present invention includes a display assembly being adapted to mount to a vehicle for providing a warning to other motorists, and including one or more plates, and also including an assembly of illuminating light being attached to the one or more plates; and also includes a support assembly being adapted to mount to a vehicle and supporting the display assembly. None of the prior art includes the combination of elements of the present invention.

There has thus been outlined, rather broadly, the more important features of the vehicle mounted warning assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new vehicle mounted warning assembly which has many of the advantages of the warning displays for vehicles mentioned heretofore and many novel features that result in a new vehicle mounted warning assembly which is not anticipated, rendered obvious, suggested, or even implied by any of the prior art warning displays for vehicles, either alone or in any combination thereof.

Still another object of the present invention is to provide a new vehicle mounted warning assembly for providing highly visible safety measures for trucks and trailers upon roadways.

Still yet another object of the present invention is to provide a new vehicle mounted warning assembly that is easy and convenient to mount to trucks and trailers, in particular.

Even still another object of the present invention is to provide a new vehicle mounted warning assembly that allows other motorists to ore easily see the size and depth of trucks and trailers traveling the roadways.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
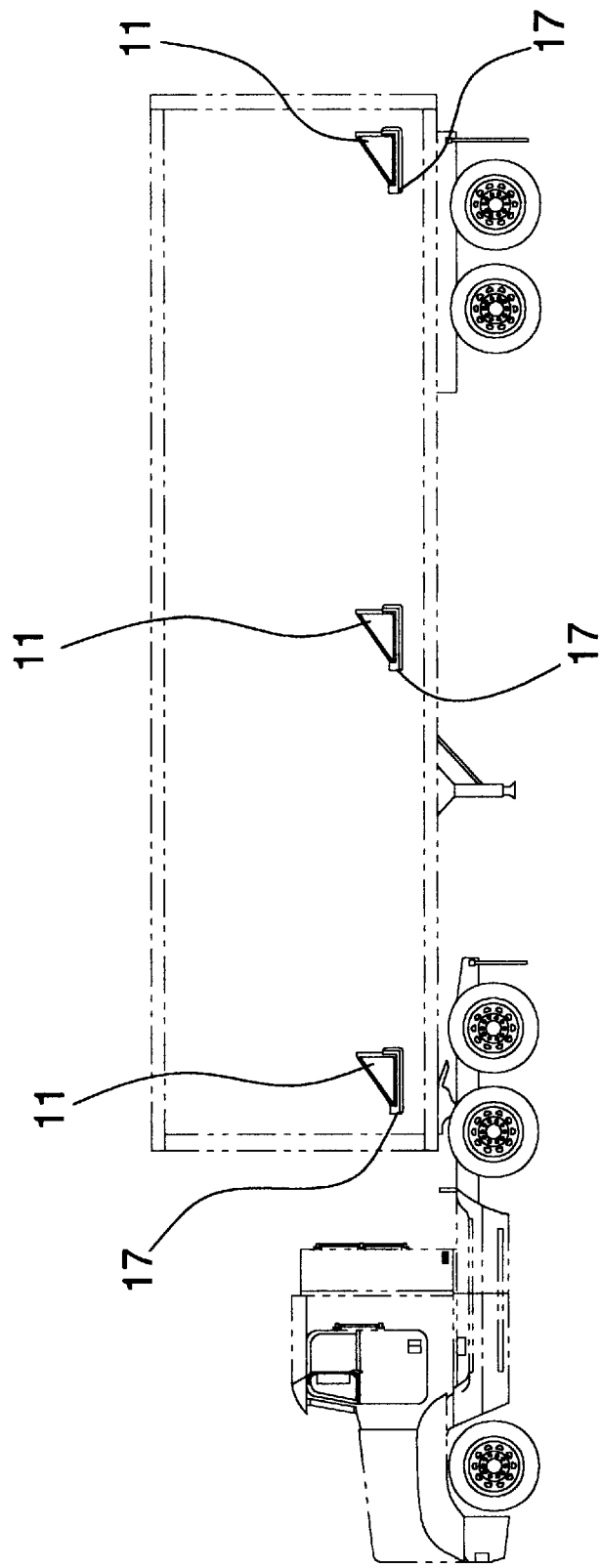
FIG. 1 is a side elevational view of a new vehicle mounted warning assembly according to the present invention.
Figure 2:
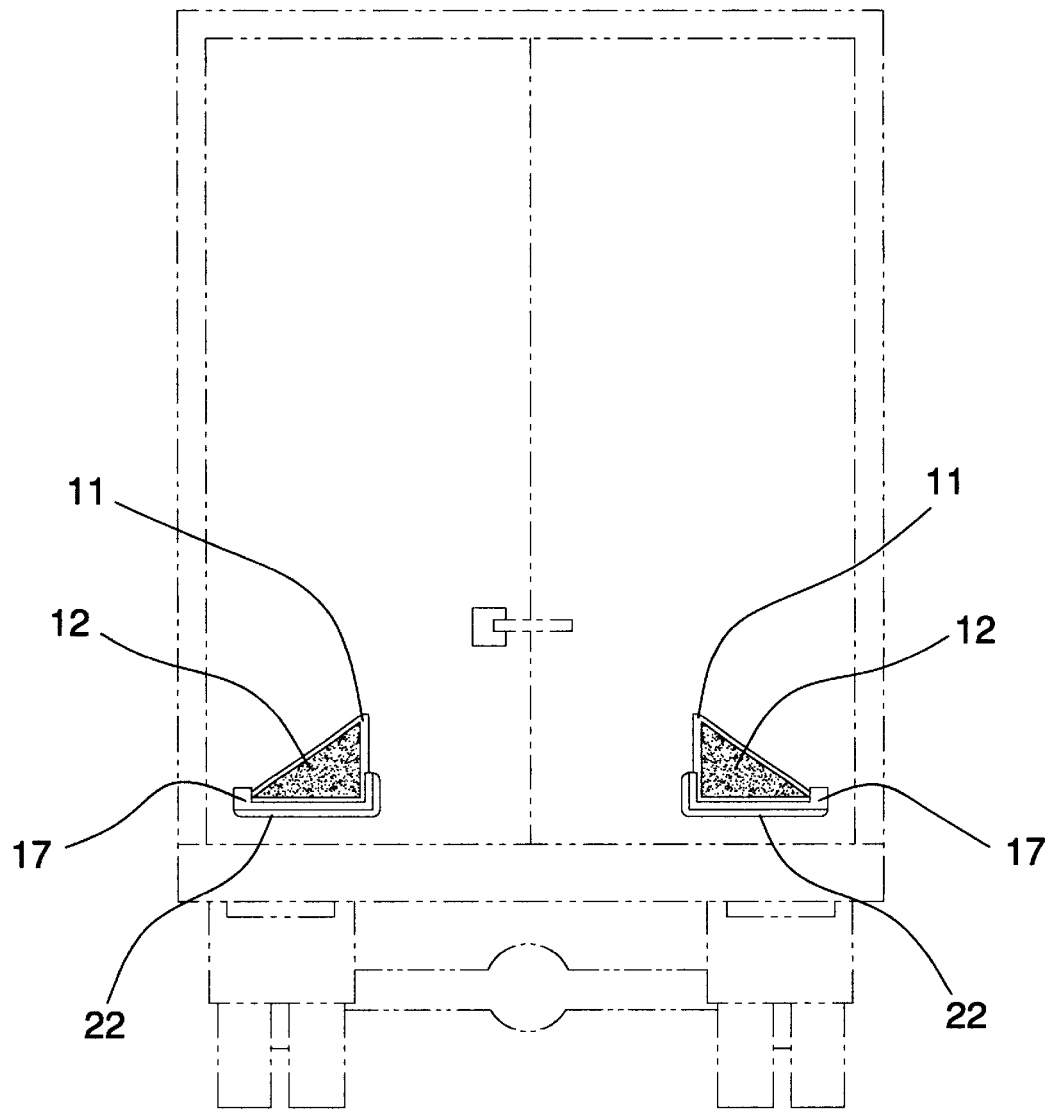
FIG. 2 is another side perspective view of the present invention.
Figure 3:
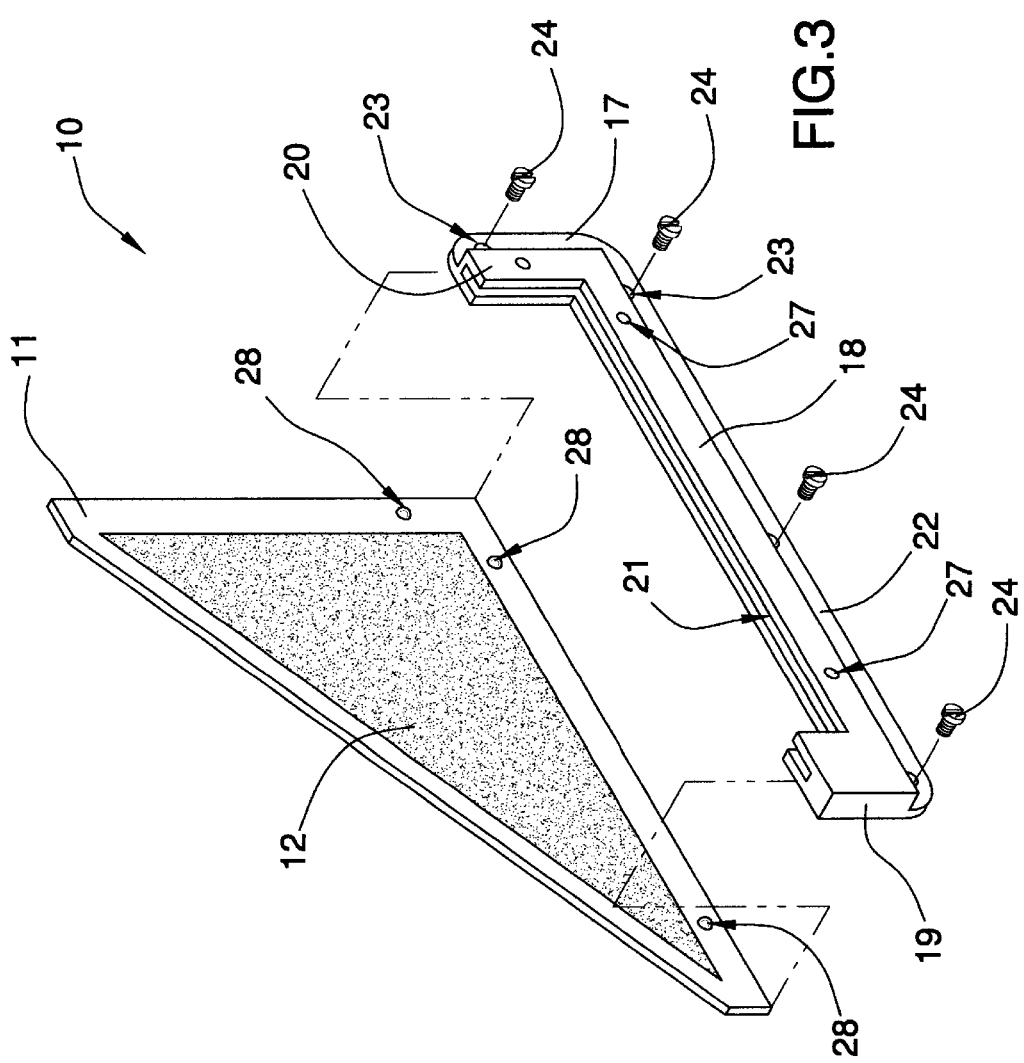
FIG. 3 is an exploded perspective view of the present invention.
Figure 4:
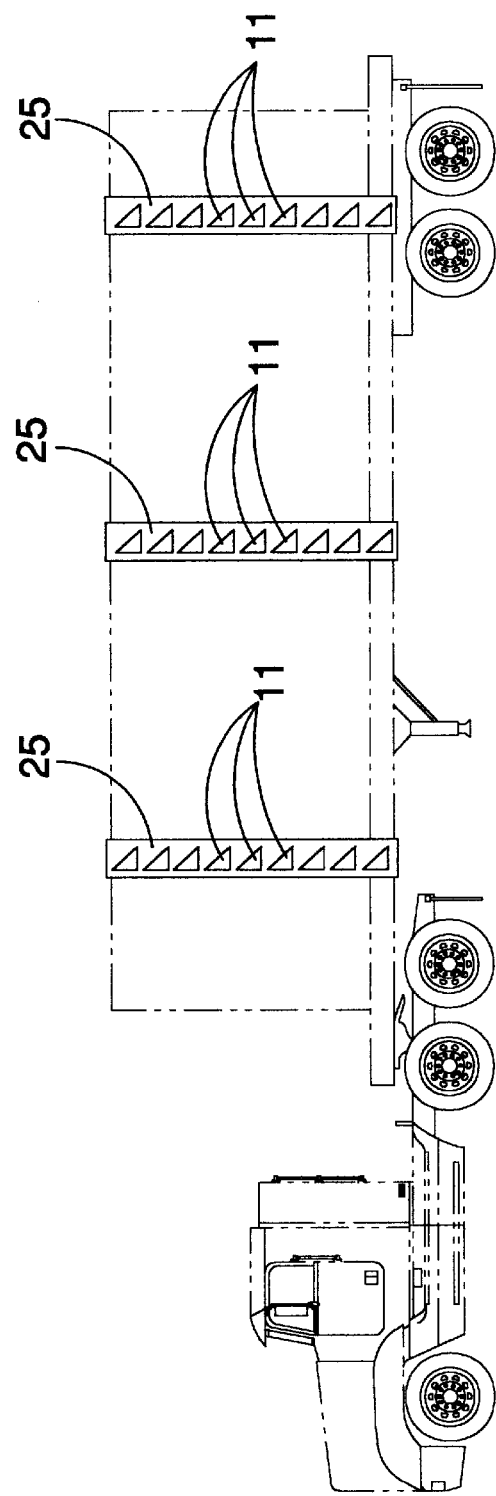
FIG. 4 is a side elevational view of a second embodiment of the present invention.
Figure 5:
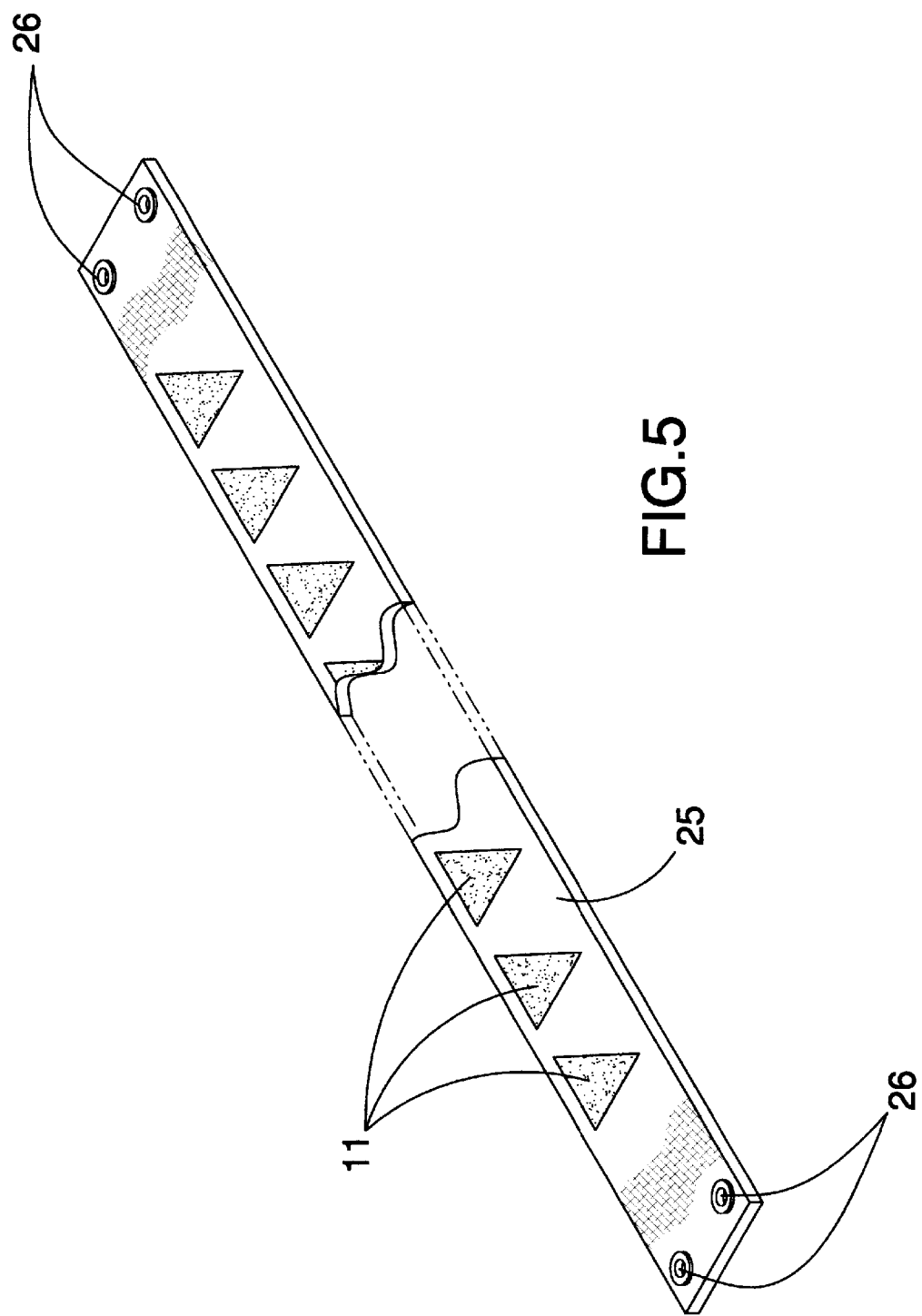
FIG. 5 is a perspective view of the second embodiment of the present invention.
Figure 6:
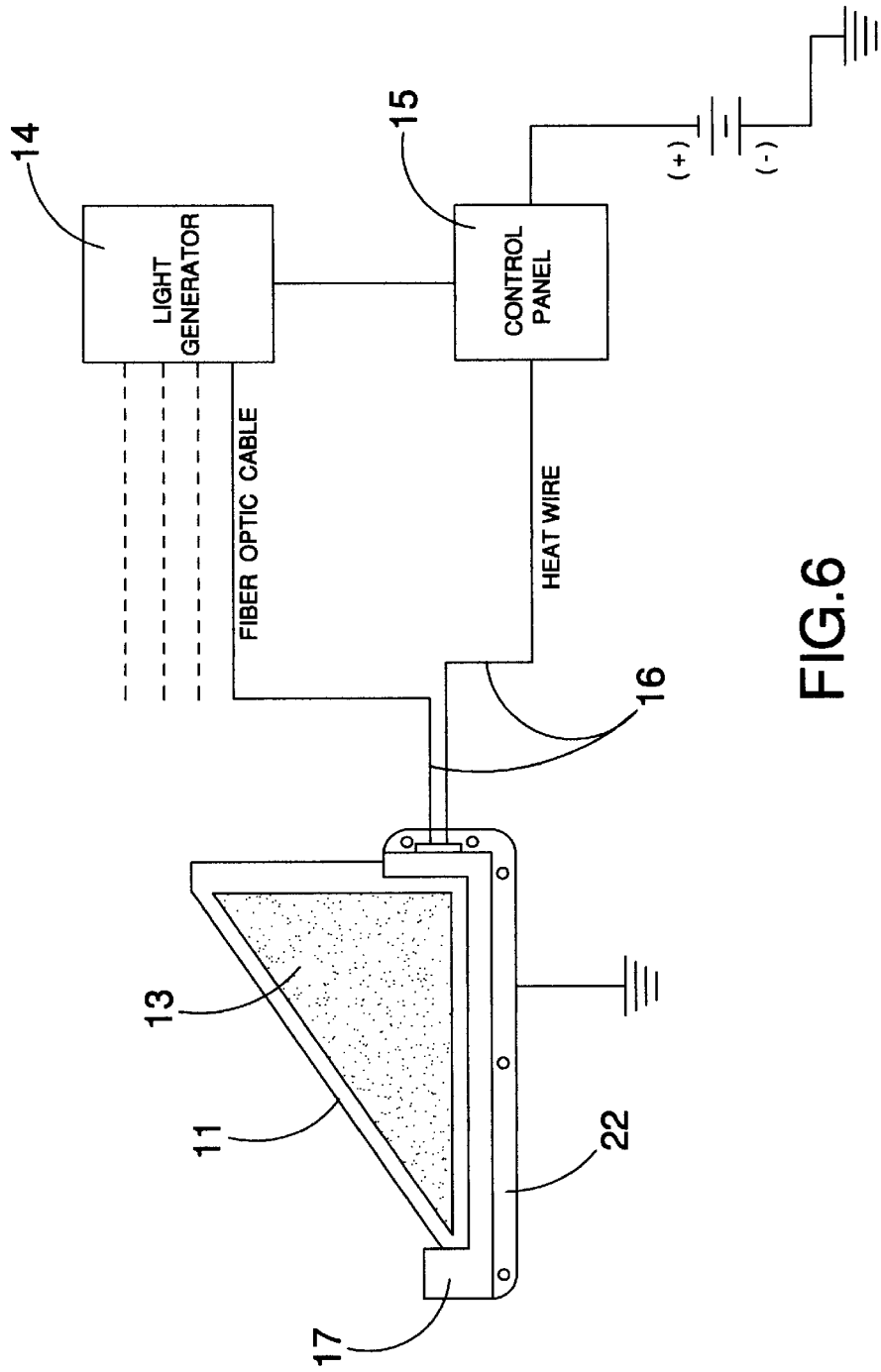
FIG. 6 is a schematic diagram of a third embodiment of the present invention.

With reference now to the drawings, and in particular to FIGS. 1 through 6 thereof, a new vehicle mounted warning assembly embodying the principles and concepts of the present invention and generally designated by the reference numeral 10 will be described.

As best illustrated in FIGS. 1 through 6, the vehicle mounted warning assembly 10 generally comprises a display assembly being adapted to mount to a vehicle for providing a warning to other motorists, and including one or more plates 11, and also including a means of illuminating light being conventionally attached to the one or more plates 11. Each of the plates 11 is right triangular-shaped and has holes 28 being spacedly disposed along a perimeter thereof. The means of illuminating light includes light reflective particles 13 being conventionally disposed upon an outwardly-faced side of each plate 11.

A support assembly is adapted to mount to a vehicle and support the display assembly. The support assembly includes one or brackets 17 being adapted to be attachable with fasteners 24 to the vehicle. Each of the brackets 17 includes an elongate main portion 18, and also includes end portions 19,20 which are angled relative to the elongate main portion 18, and further includes a strip portion 22 being conventionally attached to and disposed along a length of the elongate main portion 18 and one of the end portions 20. The elongate main portion 18 and the end portions 19,20 have a definite thickness and have holes being spacedly disposed therethrough for receiving fastening members to secure the plate 11 thereto. Each of the brackets 17 also includes a continuous groove 21 being disposed in the elongate main portion 17 and the end portions 18,19 and extending the lengths thereof and removably receiving edge portions of a respective plate 11. The strip portion 22 has a plurality of holes 23 being spacedly disposed therethrough and being adapted to receive fasteners 24 for fastening the bracket 17 to the vehicle. As a second embodiment, the support assembly includes one or more straps 25 each having grommets 26 being conventionally disposed at ends thereof for receiving tie-downs, and each strap 25 being adapted to extend about a trailer and having a definite width with the one or more plates 11 being attached thereto.

As a second embodiment, the means of illuminating light includes fiber optics 13 being conventionally attached to an outwardly-faced side of the plate 11, and also includes a light-generating member 14 being conventionally attached to the fiber optics 13, and further includes a control switch 15 being conventionally connected to the light-generating member 14 and to the fiber optics 13 with wire 16 and being adapted to be connected to a power supply such as a battery.

In use, the means of illuminating light is attached to the sides and backs of trailers, in particular, so that the headlights of approaching vehicles will be reflected from the light reflective particles so that the oncoming motorists can easily see the truck or trailer ahead of them.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the vehicle mounted warning assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle mounted warning assembly comprising:

a display assembly being adapted to mount to a vehicle for providing a warning to other motorists, and including one or more plates, and also including a means of illuminating light being attached to said one or more plates, each of said plates being right triangular-shaped and having holes being spacedly disposed along a perimeter thereof, said means of illuminating light including light reflective particles being disposed upon an outwardly-faced side of each said plate; and a support assembly being adapted to mount to a vehicle and supporting said display assembly, said support assembly including one or more brackets being adapted to be attachable with fasteners to the vehicle, each of said brackets including an elongate main portion, and also includes end portions which are angled relative to said elongate main portion, and further including a strip portion being attached to and disposed along a length of said elongate main portion and one of said end portions.

2. A vehicle mounted warning assembly as described in claim 1, wherein said elongate main portion and said end portions have a definite thickness, and have holes being spacedly disposed therethrough for receiving fastening members to secure said plate thereto, each of said brackets also including a continuous groove being disposed in said elongate main portion and said end portions end extending lengths thereof and removably receiving edge portions of a respective said plate.

3. A vehicle mounted warning assembly as described in claim 2, wherein said strip portion has a plurality of holes being spacedly disposed therethrough and being adapted to receive fasteners for fastening said bracket to the vehicle.

4. A vehicle mounted warning assembly comprising:

a display assembly being adapted to mount to a vehicle for providing a warning to other motorists, and including one or more plates, and also including a means of illuminating light being attached to said one or more plates, each of said plates being right triangular-shaped and has holes being spacedly disposed along a perimeter thereof, said means of illuminating light including light reflective particles being disposed upon an outwardly-faced side of each said plate; and a support assembly being adapted to mount to a vehicle and supporting said display assembly, said support assembly including one or more straps each having grommets being disposed at ends thereof for receiving tie-downs, and each said strap being adapted to extend about a trailer and having a definite width with said one or more plates being attached thereto.

\* \* \* \* \*